(12) United States Patent
Portalier et al.

(10) Patent No.: US 6,490,463 B1  
(45) Date of Patent: Dec. 3, 2002

(54) METHOD FOR THE PARAMETRIZATION OF A MOBILE TELEPHONE

(75) Inventors: Yves Portalier, Asnieres sur Seine (FR); Jean-Marc Dimech, Chaumont on Vexil (FR); Laurent Marjollet, Gadancourt (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/594,471

(22) Filed: Jun. 14, 2000

(30) Foreign Application Priority Data

Jun. 15, 1999 (FR) .......................................... 99 07559

(51) Int. Cl.$^7$ ................................................. H04B 1/38
(52) U.S. Cl. ...................... 455/557; 455/558; 455/410; 455/550
(58) Field of Search ................................. 455/550, 575, 455/557, 558, 418–419, 410, 411, 528; 379/357

(56) References Cited

U.S. PATENT DOCUMENTS 5,404,580 A    4/1995  Simpson et al.
5,742,910 A  * 4/1998  Gallant et al. ............... 455/550
6,223,052 B1 * 4/2001  Ali Vehmas et al. ........ 455/575

FOREIGN PATENT DOCUMENTS

FR    2 763 773    11/1998
GB    2 327 570    1/1999

* cited by examiner

Primary Examiner—Doris H. To
(74) Attorney, Agent, or Firm—Nilles & Nilles, S.C.

(57) ABSTRACT

In a mobile telephone, it is planned to divide the functions usable by this mobile telephone into basic functions and comfort functions. It is planned that access to the comfort functions should be possible only if, in a test of comparison, an operator code stored in a memory of the mobile telephone corresponds to an operator code stored in a security circuit delivered by this operator when a purchaser purchases the mobile telephone, at the same time as he takes out a subscription with this operator. It is shown that, by acting in this way, it is possible to modulate the price of the subscription which may be attractive as well as the availability of the comfort functions of the mobile telephone. This can be done in such a way that economic profitability is ensured either by encouraging the user to keep his subscription with this operator or pay a fee to the operator a fee corresponding to an additional amount that absorbs the cost of the mobile telephone.

17 Claims, 2 Drawing Sheets

METHOD FOR THE PARAMETRIZATION OF A MOBILE TELEPHONE

BACKGROUND OF THE INVENTION

1. Field of the Invention

An object of the present invention is a method for parametrizing or setting the parameters of a mobile telephone. Its purpose is to make it easier to distribute mobile telephones and therefore make it easier to match the services on offer with the services in demand, especially by proposing a technical architecture for these mobile telephones that furthers the goals of business promotion.

2. Description of the Prior Art

In mobile telephony, the operators try to attract customers by offering subscriptions that include the cost of the mobile telephone itself. The operator obtains the economic benefits entailed by such subscriptions, of course, only if the user keeps his contract going up to the end. These subscriptions are based on the principle of absorbing a part of the cost of the mobile telephone over the period of subscription even if several types of subscription can be envisaged.

It happens that, at the end of a contract period, a subscriber goes to another operator whereas, in practical terms, the duration of his contract has not been sufficient to really pay for the promotional offer that was made to him at the outset. This means a loss for the operator.

In the invention, this problem is overcome by using the presence of a security circuit. This circuit is removable and also conditions the working of the mobile telephone. In a conventional way, it includes the characteristics of the user's subscription. Indeed, especially in the field of GSM (Global System for Mobile Telephony), a mobile telephone is put into operation through the recognition, in this safety circuit, of the characteristics of the subscription, before the mobile telephone gets linked up with a base station. At the time of this recognition, the mobile telephone takes information from the security circuit or the operator who manages the subscription, especially information relating to the frequency ranges that have been granted to this operator. Then the mobile telephone gets linked up with a base station in its environment and sends this base station the characteristics of its subscription, especially its identity.

Furthermore, the removable circuit is known as a SIM or Secured Identification Module because it is associated with an anti-theft function of the mobile telephone. According to a procedure dictated by this function, the user of the mobile telephone must key in a secret code through the keypad of the telephone which validates the operation thereof.

In the invention, to resolve the commercial problem referred to here above, it has been planned to separate the use functions of a mobile telephone into at least two categories. Schematically, the basic functions are distinguished from the comfort functions. The basic functions will be the transmitter/receiver type functions of telephony and the minimum operation of a mobile telephone, especially international emergency number calls (firemen, police, etc.). The category of comfort functions would include the following: hands-free and vibration functions, storage of numbers from a directory or called numbers, calculator functions, the possibility of sending data or fax messages, etc.

Furthermore, a code corresponding to the operator code is recorded at an appropriate place in the memory of the mobile telephone. Finally, in a use menu, when the mobile telephone is put into operation, a comparison is activated between an operator code contained in the security circuit and the operator code stored in the mobile telephone. If the comparison tallies, the system permits access to a comfort function. If the comparison does not tally, then only the basic functions will be accessible. Thus, the user who changes his the operator could effectively keep the mobile telephone, which has become his property. However, this telephone henceforth will only work with fewer interesting functions.

In one improvement, if the user wishes to convert this mobile telephone into one that performs as well as before, he will have to contact his former operator for a code to release the comfort functions. Naturally this releasing code will be given to him only against payment of the non-amortized portion of the cost of the mobile telephone that had been given to him at the beginning of the subscription. In this way, a particularly simple technical solution is provided to the problem referred to.

SUMMARY OF THE INVENTION

An object of the invention therefore is a method for the parametrization of a mobile telephone wherein:

programs representing use functions of this mobile telephone are loaded into a memory of this mobile telephone, the mobile telephone is provided with a first removable security circuit, information encoded in the security circuit is compared with operating information, and the operation of the mobile telephone is authorized as a function of this comparison, wherein:
the programs are distributed between at least two groups respectively corresponding to basic functions and comfort functions, a first operator code is stored in the security circuit, a second operator code and a code authorizing the use of the functions is stored in a memory of the mobile telephone, the first and second operator codes are compared, and the implementation of the comfort functions is authorized as a function of this comparison of the first and second operator codes.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DRAWING

Figure 1:
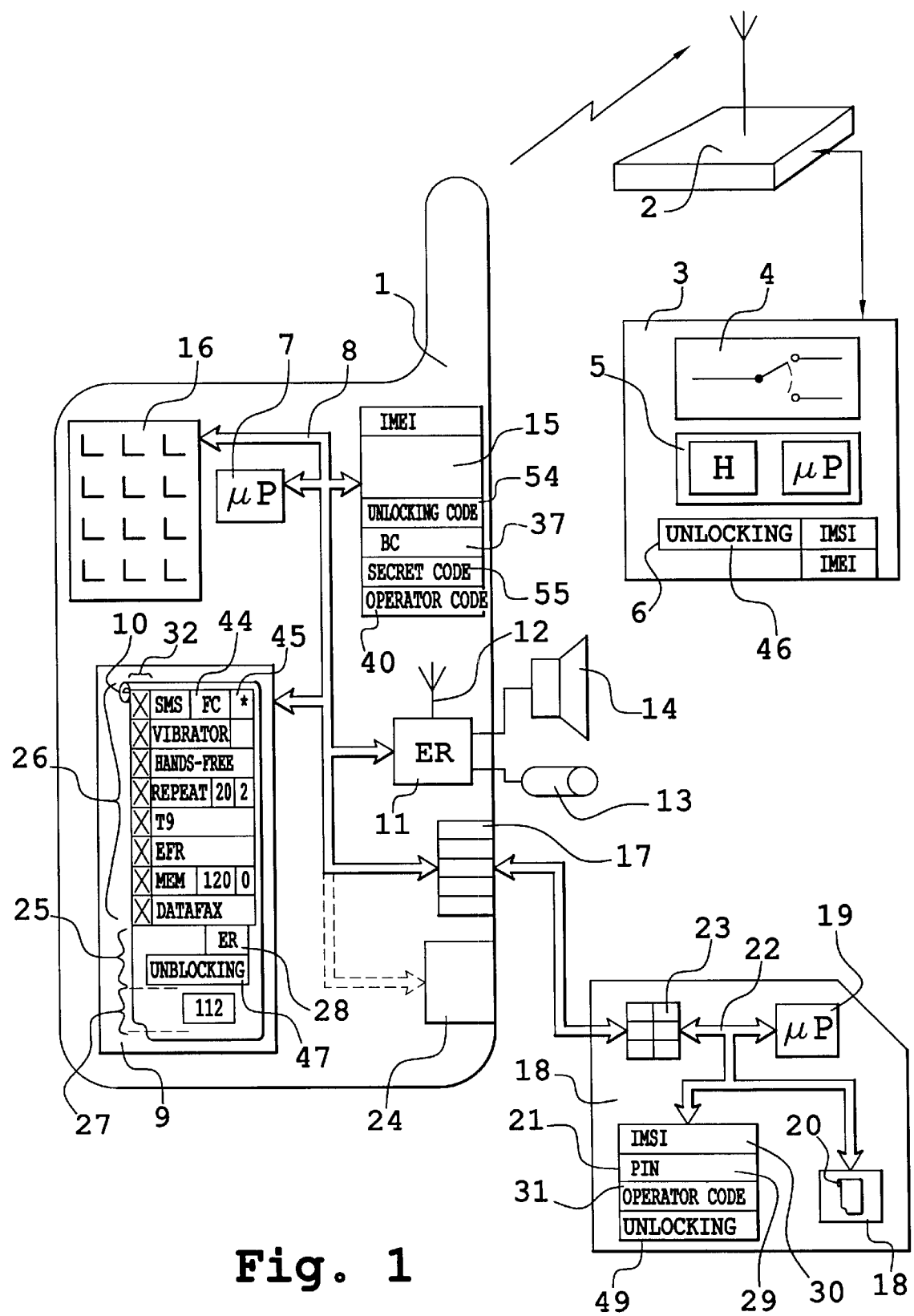
FIG. 1 is a schematic view of a mobile telephone and a mobile telephony network that can be used to implement the method of the invention.

FIG. 1 gives a schematic view of the means that can be used to implement the method of the invention. These means comprise a mobile telephone 1 which, by means of a base station 2, can get linked up with the central circuits 3 of a mobile telephony operator. The central circuits 3 essentially comprise switching circuits 4 to enable the user of the telephone 1 to communicate with another partner. They also comprise electronic circuits 5 that include memories 6.

The mobile telephone 1, in a standard way, has a central processing unit 7 connected by a bus 8 to a program memory 9 containing a program 10. The program 10 is used to implement all the functions of the mobile telephone. Through the bus 8, the central processing unit 7 is furthermore connected with transmission/reception circuits 11 that are themselves connected with a radiating antenna 12 and, in a known way, with a microphone 13 and one or more loudspeakers 14. The bus 8 is furthermore also connected to a data memory 15, a control keyboard 16 and an interface 17 for the connection of the telephone 1 with a security circuit 18. The security circuit 18 has an architecture comparable to that of the mobile telephone 1 with a microprocessor 19, a program memory 20 and a data memory 21 connected together by a bus 22 to a connection interface 23 with the interface 17.

The mobile telephone 1 can furthermore be provided with ancillary circuits 24, which, for example, are schematically connected to the bus 8 but may be organized or connected differently. The circuits 24 for example represent a vibrator designed to replace the ringing system to make the mobile telephone more discreet. Or else they may represent a hands-free loudspeaker or else a transmission/reception device to be fitted into a microphone and a loudspeaker, which are detached and carried in a set of headphones. They represent equipment and/or functions ancillary to the telephone 1.

According to an essential characteristic of the invention, the functions of the use of the mobile telephone will be divided into basic functions 25 and comfort functions 26. In practice, this division will even be supplemented by indispensable functions 27. The presence of the basic functions 25 and the indispensable functions 27 is known in the prior art. These indispensable functions include essentially the possibility of calling urgent numbers, for example 112 which is the number in Europe for calling the fire-fighting department. These indispensable functions, of the 112 call type, can be used with a GSM type telephone even if it does not have a security circuit 18. Therefore, in this case, none of the operations for verifying the presence of this security circuit plays a decisive role in preventing these emergency numbers from being called.

The basic functions 25 include essentially the transmission-reception function 28 which, in a known way, when the mobile telephone is put into operation, will comprise the comparison of a secret code, keyed in by the user on the keypad 16, with a secret code 29 stored in the memory 21. This secret code is the PIN (Personal Identification Number) code. Once the telephone has been put into operation, the program 28 and/or the subprogram 10 pick up two pieces of information from the memory 21. These are a piece of information 30 known as IMSI (International Mobile Subscriber Identity) and a piece of information 31 known as the OPERATOR CODE representing the mobile telephony operator with whom a subscription has been taken out. When the telephone is put into operation, these two pieces of information are exchanged between the mobile telephone 1 and the base station 2 in such a way that the circuits 3 recognize the mobile telephone 1 and authorize the making of its call on the network of this operator. The basic functions 28 naturally include the possibility, for a user, of dialing a telephone number, getting connected to another party and exchanging speech signals with this other party. If necessary, certain other functions may be incorporated into the basic functions. These functions may include, for example, the lighting up of a screen if the mobile telephone is used at night, the conversion of the mobile telephone into a calculator, and so on.

However, according to the invention, in the program 10, all the functions that can be used will be differentiated into at least two groups: the basic functions 25 and the comfort functions 26. In practice, in the program 10 of the memory 9, subprograms corresponding to these different functions are stored at addresses. These addresses can these be used to separate the functions into basic functions and comfort functions. For example, as shown schematically, the comfort functions 26 would have subprogram storage addresses corresponding to values below the addresses for storing the subprograms of the function 28. Of course, a different procedure may be used. The representation given herein is purely schematic.

Preferably, each function subprogram will have a parameter, in its header, indicating that it represents a basic function or a comfort function. As a non-restrictive example, these comfort functions could include SMS (Short Message Service) type functions, vibrator type functions, a hands-free function, a function facilitating alphabetical access to a memory of the mobile telephone since the keypad 16 is in principle a numerical keypad and not an alphanumerical one, an EFR function which is a function used to disseminate very high-quality digital sound and a data-fax function by which the mobile telephone can send or receive data and/or fax messages.

Other comfort functions will be slightly more complex. There may be for example a memorizing function MEM in which there are two modes of use, a basic use mode and a comfort use mode. For example, here we have schematically shown that if the memorizing function is used in basic mode, it cannot be used to memorize telephone numbers in a memory of the mobile telephone whereas if it is used in a comfort mode, it can memorize 120 of them. Similarly, a REPEAT function can be used to redial the numbers called and/or received by the mobile telephone. In the basic mode, only two such numbers will be memorized. In the comfort mode, 20 of them could be memorized.

The implementation of these comfort functions is conditioned by the presence of the corresponding subprograms in the program 10. To the sake of simplification, the general program 10 of a mobile telephone will comprise all these possibilities, whether or not the mobile telephone is fitted out with ancillary equipment and circuits 24 corresponding to these functions. For example, it is possible that there will be no vibrator circuit in the mobile telephone. For example, this will happen when it has been sought, at the manufacturing stage, to make mobile telephones of different qualities, priced differently depending on their equipment. In this case, in the subprograms of the comfort functions, an additional piece of information will be present in the header as a complement to the information on their comfort characteristics. This additional information will state that this function may or may not be actually implemented in the mobile telephone 1 concerned. For example, in a header zone 32 of each of the subprograms corresponding to these comfort functions, there is a piece of information stating whether the function is truly available or not. For example, a cross has been used here to indicate that all the comfort functions of the group 26 are accessible with the mobile telephone 1. This is a telephone provided with all the use options.

Figure 2:
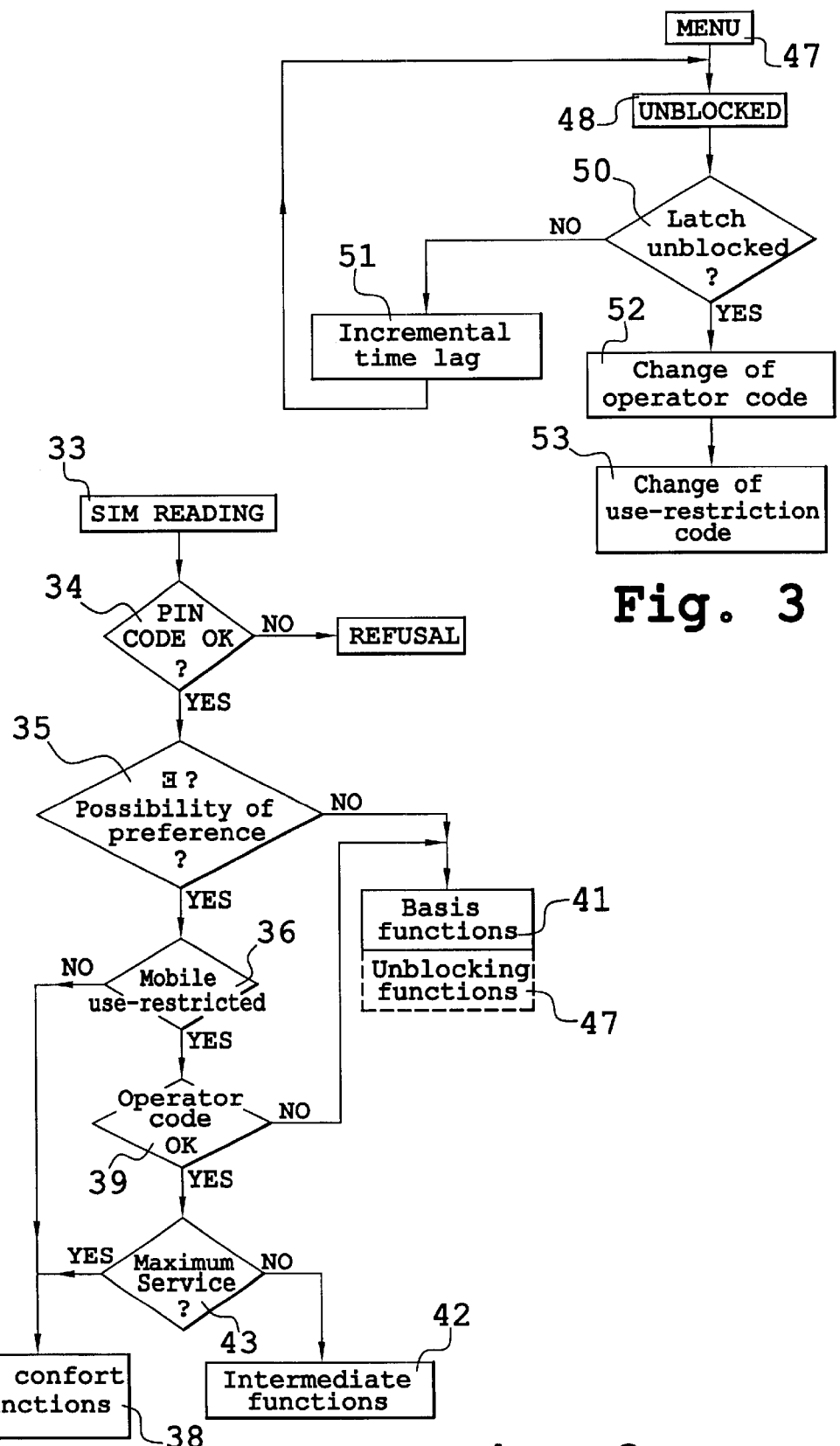
FIG. 2 shows the different steps of the method of the invention in a general program contained in the mobile telephone.

FIG. 2 shows the steps of the method of the invention. During a first step 33, when the telephone 1 is to put into operation, the microprocessor 7, applying the subprogram 28 of the program 10, prompts the reading of the SIM security circuit 18. The program 28 and the program 20 then comprise the implementation of a test 34 by which the user must key in the PIN code corresponding to the circuit 18 on the keypad 16. In the event of failure, especially repeated failure, the telephone will not be put into operation. It is in a barred situation in which, however, the use of the essential functions 27 is still possible. In the event of success, the program 10 activates a test 35 in which it is verified that at least one of the comfort functions of the group 26 possesses an indication of presence in the subprogram header zone 32. For example, if the telephone is a bottom-of-the-market telephone, with no optional features whatsoever, then only the basic functions 25 will be available.

However, if it possesses at least one comfort function, the program 10 launches an essential test 36 of the invention. During the test 36, it is ascertained that the use of the basic functions 26 is restricted or not restricted. This condition will be expressed by the presence of a piece of information BC in a zone 37 of the memory 15 (which would also be a zone in the memory 21 of the circuit 18). This piece of information BC represents the blocked state of the comfort functions. For example, this piece of information could be encoded on 2 bits. If these 2 bits are in the state 00, it will be assumed that the comfort function 26 can be freely used. Thus, the mobile telephone 1 can access a menu 38 comprising all the functions 25, 26 and 27.

If, on the contrary, the code is different, for example 01, it will be known that it is a telephone in which the use of the comfort functions cannot be accessed unconditionally. It is then accessible only on condition of success in a subsequent test 39 during which it is ascertained that an operator code, stored in the zone 40 of a memory 15, corresponds to or is identical to the operator code stored in a zone 31 of a memory 21. Ultimately, it will be ascertained that the user is continuing to use the mobile telephone within the framework of his subscription contract corresponding to the purchase of his mobile telephone. This means that the purchaser, when purchasing his mobile telephone from an operator, had purchased a low-cost mobile telephone which however, as a tradeoff, already contained this operator's code pre-recorded in the zone 40. This can be easily done by a mobile telephone manufacturer who sells an operator batches of mobile telephones. To achieve this, all that needs to be done, when customizing the mobile telephones for example in order to give them their a series number (IMEI) of their own, is to record the operator code in the zone 40 of the memory 15.

If the device fails the test 39, it means that the circuit 18 has given an operator code different from the one stored in the zone 40. Thus, the mobile telephone will propose only a menu 41 of basic functions, typically the functions 25.

If the test 39 recognizes a successful comparison, it is possible, as a variant, to access the menu 38 or a menu 42 which, in terms of comfort functions, is in between the menu 41 and the menu 38. For example, only some of the functions of the group 26 will be usable in the menu 42 whereas they are all usable in the menu 38. In this case, the use-restriction code 37, instead of having a value 01, namely one that is essentially different from 00, could have a value 1, 2, 3 by which a test 43 can arbitrate between the totality or only a part of the comfort functions made available.

To organize this situation, it can be planned that the header 41 of each of the subprograms of the comfort functions of the group 26 will contain a subgroup information element pertaining to the comfort function blocking code. Thus, if the value 00 is present in the zone 37, then all the comfort functions are available without any verification by the test 39. If BC has the value 01 in the zone 37, then the test 43 will also provide access to the menu 38 in which all the comfort functions are accessible. On the contrary, if there is a value 02 stored in the zone 37, the comfort functions taken into consideration will be those which, in addition to a comfort function code FC stored in the zone 44, possess, in a zone 45 associated with the same comfort function, an indication, for example in this case a star, indicating that the function concerned is part of the group of intermediate functions that can be presented by the menu 42. The absence of the star eliminates the concerned function from the menu 42. By this procedure, the functions of the mobile telephone are organized so as to be made available (inasmuch as the mobile telephone is equipped with these functions). This corresponds firstly to a situation in which a type of subscription has been taken (as verified by the test 43) and secondly, through the test 39, to the personality of an operator with whom the subscription has been taken.

Figure 3:
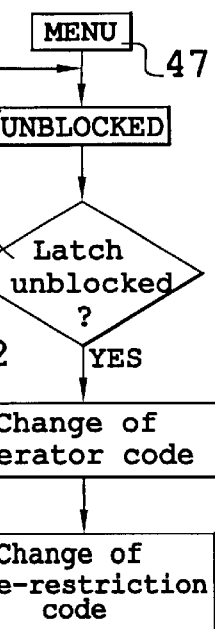
FIG. 3 is a flow chart of operations performed to correspond to the release of the comfort functions after a change of operator.

When there is a termination of contract (FIG. 3), the user of the mobile telephone 1 is allowed to recover the totality of the functions of this mobile telephone by approaching the operator of the circuit 3 and asking him to communicate, for example in writing (against payment of course), an unlocking code 46 stored in the memory 6 of the circuit 3 corresponding to an information element IMSI corresponding to the circuit 18. With this information, the user may choose, preferably from the basic functions 25, an unblocking menu 47 by which, during an operation 48, the program 10 asks this user to key in the unlocking code by the keypad 16. This operation 48 is designed to compare the key-in unlocking code, in the circuit 7, or even in the circuit 19, with an unlocking code 54 already present in the memory 15 or possibly an unlocking code 49 already present in the circuit 18.

If the correspondence is not established during a step 50 for comparing the two unlocking codes, the user may start again. Preferably he could start again as many times as he wishes but each time he has to wait during a waiting period dictated by a waiting step 51 whose duration keeps getting longer with each successive failure.

In the event of success, essentially two modifications will be activated. Firstly, during a step 52, the operator code 40 will be changed. It can be replaced by an artificial operator code, for example a series of Is. It is also possible to replace it directly by an operator code of another operator whose SIM circuit will be put in the place of the first SIM circuit in the telephone 1. Secondly, as a preliminary, in a step 53, the contents of the zone 37 will be changed to indicate that the mobile telephone is no longer use-restricted (code 00).

As a variant, the unlocking code will be stored in the memory 15 at a location 54. In this case, the unlocking operation 48 will preferably comprise a decryption or an encryption of the code keyed in through the keypad 16 and/or the code transmitted by the operator of the circuit 3 before comparing it with the code of the zone 54. This decryption may be done by using a secret code contained in the zone 55 of the memory 15. This secret code is furthermore known in the memory 6 in correspondence with the series number IMEI of the mobile telephone and with the IMSI number of the circuit 18 also stored in the memory 6.

When the unlocking takes place, the zone 37 has an indication 01 (stating that all the comfort functions are available) or a piece of information 02 (stating that only some are accessible even if all are incorporated into the mobile telephone). In this case, it can be planned that another operator, who will see to the additional payment, can also envisage making all or a part of these comfort functions available. In this case, the unlocking code may have not just one value but also several values. The decryption of this unlocking code always leads to the replacement of one value or another in the zone 37, in addition to the changing of the name of the operator code.

The encryption of the unlocking code and its decryption may comprise the taking into consideration firstly of the identification 30 (IMSI) of the subscription and secondly of the mobile telephone number (IMEI). Subsequently, this circuit 18 will be replaced by the one corresponding to a new operator.

What is claimed is:

1. A method for the parametrization of a mobile telephone wherein:

program representing use functions of this mobile telephone are loaded into a memory of this mobile telephone, the mobile telephone is provided with a first removable security circuit, information encoded in the security circuit is compared with operating information, and the operation of the mobile telephone is authorized as a function of this comparison, wherein:

the programs are distributed between at least two groups respectively corresponding to basic functions and comfort functions, a first mobile telephony operator code established by a mobile telephone subscription provider is stored in the security circuit, a second mobile telephony operator code established by a mobile telephone subscription provider and a code authorizing the use of the function is stored in a memory of the mobile telephone, the first and second operator codes are compared, and the implementation of the comfort functions is authorized as a function of this comparison, whether positive or not, between the first and second mobile telephone operator codes, the number of comfort functions authorized is less when the mobile telephone subscription provider that establishes said first mobile telephony operator code is an entity different from the mobile telephone subscription provider that establishes said second mobile telephone operator code than when the mobile telephone subscription provider that establishes said first mobile telephone operator code is the same entity as the mobile subscription provider that establishes said second mobile telephone operator code.

2. A method according to claim 1, wherein to carry out the loading:

a full program possessing all the comfort functions is memorized, and the implementation of the comfort functions that correspond to ancillary equipment of this mobile telephone actually made available is validated.

3. A method according to claim 1, wherein the first and the second mobile telephony operator codes are compared if a code authorizing the use of the functions, stored in the memory of the mobile telephone, states that the use of the mobile phone is restricted.

4. A method according to claim 1, wherein:

the implementation of all or part of the comfort functions is authorized as a function of this comparison of the first and second mobile telephone operator codes.

5. A method according to claim 1, wherein a secret code is memorized in the mobile telephone, the mobile telephone is provided with a second security circuit that replaces the first security circuit, a secret code keyed in at the keypad is compared with a secret code memorized in the mobile telephone, and as a function of this comparison, the second mobile telephony operator code present in the memory of the mobile telephone is modified either to make it correspond to an operator code memorized in the second security circuit or by putting an artificial operator code therein.

6. A method according to claim 5, wherein should the comparison result in a failure, another comparison is authorized after a waiting period, but the duration of this waiting period is increased in the event of repeated failures.

7. A method according to claim 1, wherein the second mobile telephony operator code and/or the code authorizing the use of the functions is stored in a memory of the mobile telephone in encrypted form.

8. A mobile telephone system comprising:

a mobile telephone, wherein said mobile telephone includes a plurality of functions and a first mobile telephone operator code that is set by a mobile telephone subscription provider; and a security circuit, wherein said security circuit operably interfaces with said mobile telephone, wherein said security circuit includes a second mobile telephone operator code set by a mobile telephone subscription provider, wherein upon said security circuit being operably interfaced with said mobile telephone said first mobile telephone operator code is compared with said second mobile telephone operator code, and wherein a result of the comparison determines which of said plurality of functions is available to a user of said mobile telephone;

wherein if the mobile telephone subscription provider that sets said second mobile telephone operator code is an entity different from the mobile telephone subscription provider that sets the first telephone operator code, the number of said plurality of functions available to said user through said result of the comparison is less than if the mobile telephone subscription provider that sets said second mobile telephone operate code is the same entity as the mobile telephone subscription provider that sets the first telephone operator code.

9. The system of claim 8, wherein said plurality of functions are selected from a group consisting of basic functions and comfort functions.

10. The system of claim 9, wherein upon said result determining that less than all of said plurality functions are available to said user, a function activation code provided by the telephone subscription provider that set said first mobile telephone operator code may be entered into said mobile telephone to avail more of said plurality of functions to said user.

11. The system of claim 8, wherein upon said result determining that less than all of said plurality functions are available to said user, a function activation code provided by the telephone subscription provider that set said first mobile telephone operator code may be entered into said mobile telephone to avail all of said plurality of functions to said user.

12. The system of claim 8, further comprising a base station, wherein having been previously determined, said mobile telephone communicates to said base station which of said plurality of functions is available to said user.

13. A method for the parametrization of a mobile telephone wherein said mobile telephone includes a plurality of functions, the method comprising the steps of:

comparing a first mobile telephone operator code established by a mobile telephone subscription provider with a second mobile telephone operator code established by a mobile telephone subscription provider to produce a result;

determining from said result which of said plurality of functions are available to a user of said mobile telephone, the number of said plurality of functions available to said user being less when the mobile telephone subscription provider that establishes said first mobile telephone operator code is an entity different from the mobile telephone subscription provider that establishes said second mobile telephone operator code, than when the mobile telephone subscription provider that establishes said first mobile telephone operator code is the same entity as the mobile telephone subscription provider that establishes said second mobile telephone operator code; and enabling operation within said mobile telephone of those said plurality of functions that are available to said user.

14. The method of claim 13, wherein said plurality of functions are selected from a group consisting of basic functions and comfort functions.

15. The method of claim 14, further comprising the steps of:

obtaining a function activation code from the mobile telephone subscription provider that established the first telephone operator code if less than all of said plurality of functions are available to said user;

entering said function activation code into said mobile telephone; and availing the user of more of said plurality of functions upon entry of said function activation code.

16. The method of claim 13, further comprising the steps of:

obtaining a function activation code from the mobile telephone subscription provider that established the first telephone operator code if less than all of said plurality of functions are available to said user;

entering said function activation code into said mobile telephone; and availing the user of all of said plurality of functions upon entry of said function activation code.

17. The method of claim 13, further comprising the step of informing a base station of those said plurality of functions that are available to said user.

* * * * *